March 27, 1951 L. W. BOOTHBY 2,546,147

FREQUENCY DISTINGUISHING DEVICE

Filed Aug. 29, 1945 5 Sheets-Sheet 1

Inventor
LAWRENCE W. BOOTHBY

By Ralph L. Chappell

Attorney

March 27, 1951 L. W. BOOTHBY 2,546,147

FREQUENCY DISTINGUISHING DEVICE

Filed Aug. 29, 1945 5 Sheets-Sheet 2

Inventor
LAWRENCE W. BOOTHBY

By Ralph L Chappell

Attorney

March 27, 1951 L. W. BOOTHBY 2,546,147

FREQUENCY DISTINGUISHING DEVICE

Filed Aug. 29, 1945 5 Sheets-Sheet 3

Inventor
LAWRENCE W. BOOTHBY

By Ralph L Chappell
Attorney

March 27, 1951 L. W. BOOTHBY 2,546,147

FREQUENCY DISTINGUISHING DEVICE

Filed Aug. 29, 1945 5 Sheets-Sheet 4

March 27, 1951 L. W. BOOTHBY 2,546,147

FREQUENCY DISTINGUISHING DEVICE

Filed Aug. 29, 1945 5 Sheets-Sheet 5

INVENTOR
LAWRENCE W. BOOTHBY

BY D. B. Snyder
Howard White
ATTORNEYS

Patented Mar. 27, 1951 2,546,147

UNITED STATES PATENT OFFICE 2,546,147

FREQUENCY DISTINGUISHING DEVICE

Lawrence W. Boothby, Alexandria, Va.

Application August 29, 1945, Serial No. 613,410

5 Claims. (Cl. 250—20)

(Granted under the act of March 3, 1883, as amended April 30, 1928; 370 O. G. 757)

This invention relates to frequency determining apparatus, and more particularly to a frequency determining device adapted to distinguish between a plurality of signal responses, only one of which corresponds to the actual carrier frequency being received.

In the operation of certain ultra-high-frequency superheterodyne radio receivers ambiguous frequency readings often occur because of the presence of spurious responses. Spurious responses are produced by non-linearity in the mixer, when harmonics of the fundamental frequency of the local oscillator combine in the mixer, predominantly with the fundamental of the incoming signal; and to a lesser extent with the higher harmonics of the signal, which are usually of negligible amplitude. Under these circumstances, it is often difficult, if not impossible, to determine the true carrier frequency being received.

In the prior art, attempts were made to use one or more stages of preselection in order to minimize trouble from spurious responses produced in superheterodyne receivers. However, preselection for ultra-high-frequency superheterodyne receivers which are required to tune over an extended range has not proven feasible to-date. The inductor and capacitor circuit combinations commonly employed for wave trap applications at lower frequencies are unsatisfactory in this instance because of the limited tuning ranges which may be obtained and the difficulties due to spurious resonances in the lumped circuits.

Accordingly, it is an object of the present invention to provide simple positive means for distinguishing between a plurality of signal responses, and to thereby enable the selection of a correct frequency reading corresponding to the fundamental of the carrier frequency actually being received by the radio receiver.

A further object of this invention is to provide a frequency-determining device having a low insertion loss during the time signals are being received by the superheterodyne receiver.

Still another object of this invention is to provide a frequency-determining device which is simple and compact and which will tune over a frequency range of the order of 25 to 1.

It is still another object of this invention to provide a frequency-determining device which will enable the measurement of frequencies which are relatively high, and which measures between adjacent multiple null positions on the dial of said device.

Other and further objects of this invention will be obvious upon understanding of the illustrative embodiments about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, in which.

Figure 1:
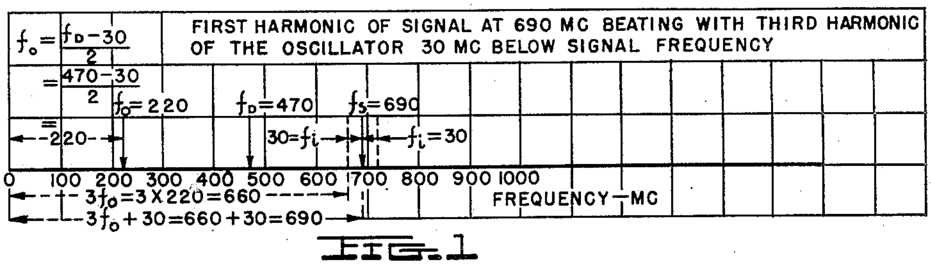
Fig. 1 is a diagram illustrating a specific example of the formation of a spurious response.

Referring now to Fig. 1, there is shown diagrammatically the formation of a spurious response in the particular case of the first harmonic of the signal at 690 megacycles, beating with the third harmonic of the local oscillator, the third harmonic of the oscillator being 30 megacycles below the first harmonic of the signal frequency.

In the particular heterodyne receiver to which Figs. 1 to 4, inclusive apply, the local oscillator frequency $f_o$ is given by the following:

$$f_o=\frac{f_d-f_i}{2} \quad (1)$$

Where $f_d$ equals the frequency in megacycles indicated on the receiver dial, which is calibrated to correspond to the frequency of antiresonance of the input and rf amplifier stages; and in which $f_i$ is equal to the intermediate-frequency of the receiver.

Equation 1 states that the second harmonic of the oscillator frequency $2f_o$, tracks below the dial frequency $f_d$ by a constant amount equal to the intermediate frequency, $f_i$, of the receiver.

When the intermediate frequency is 30 megacycles, and the oscillator frequency tracks below the dial frequency:

$$f_o=\frac{f_d-30}{2} \quad (2)$$

In the present example, the calibrated dial reading on the receiver dial will indicate that a response obtained corresponds to the fundamental carrier frequency only when the oscillator second harmonic beats with the carrier fundamental, and the second harmonic of the oscillator is 30 megacycles below the carrier fundamental frequency. However, as shown in Figs. 1 to 3 inclusive, very often not the second harmonic, but, the third, fourth, fifth, or sixth harmonic, etc., may also beat with the fundamental frequency of a signal, thereby giving rise to spurious frequency readings.

Figure 2:
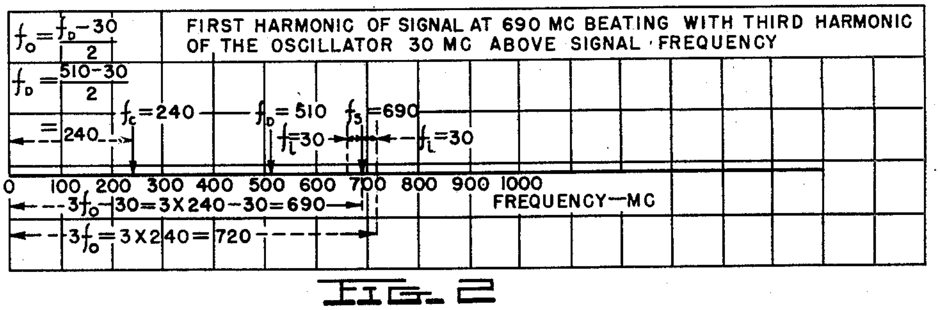
Fig. 2 is a diagram illustrating another specific example of the formation of a spurious response.

Referring to Fig. 2, the formation of a spurious response there shown is similar to the example of Fig. 1, with the exception that the third harmonic of the oscillator frequency is instead 30 megacycles above the fundamental signal frequency, and is beating with the fundamental signal frequency to produce another spurious response on the dial.

Figure 3:
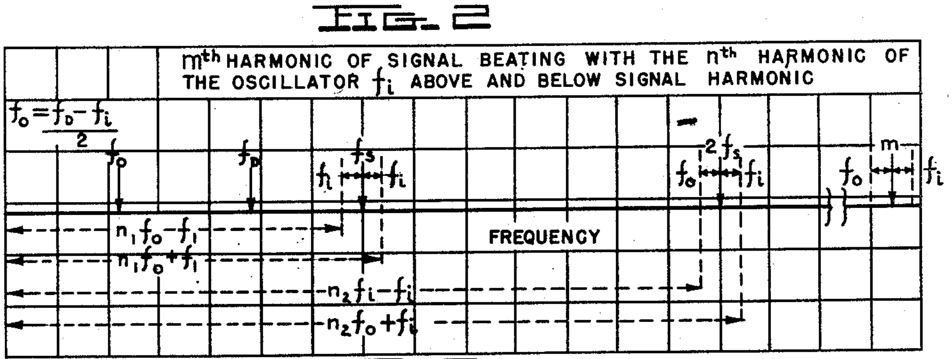
Fig. 3 is a diagram illustrating the formation of spurious responses in general.

In Fig. 3 there is diagrammatically shown the general case of the production of spurious responses. There is shown the fundamental input signal frequency as well as the second harmonic and the $m$th harmonic of the signal frequency. There is also shown the $n$th harmonic of the oscillator beating with the first, second, or $m$th harmonic of the signal frequency. The oscillator harmonic may beat with the signal harmonic in two ways. The oscillator harmonic may beat with the signal harmonic either $f_i$ above, or $f_i$ below the signal harmonic.

From a consideration of the Fig. 3 and having a receiver which tracks according to Equation 1, it is possible to set down a general relation for all spurious responses which may be received over the dial of the receiver, as follows:

$$mf_s=nf_o\pm f_i \quad (3)$$

But from the Equation 1:

$$f_o=\frac{f_d-f_i}{2}$$

Hence, in this case:

$$mf_s=n\frac{(f_d-f_i)}{2}\pm f_i \quad (4)$$

From which, solving for $f_d$:

$$f_d=\frac{2}{n}(mf_s\mp f_i)+f_i \quad (5)$$

In the particular case when $f_i$ equals 30 megacycles, Equation 5 becomes:

$$f_d=\frac{2}{n}(mf_s\mp 30)+30 \quad (6)$$

This relation has been found to accurately correspond to spurious frequencies obtained empirically.

Although the frequencies of the spurious responses can be calculated from the above equations, the procedure is not simple, and the present invention avoids the necessity for such calculations.

Figure 4:
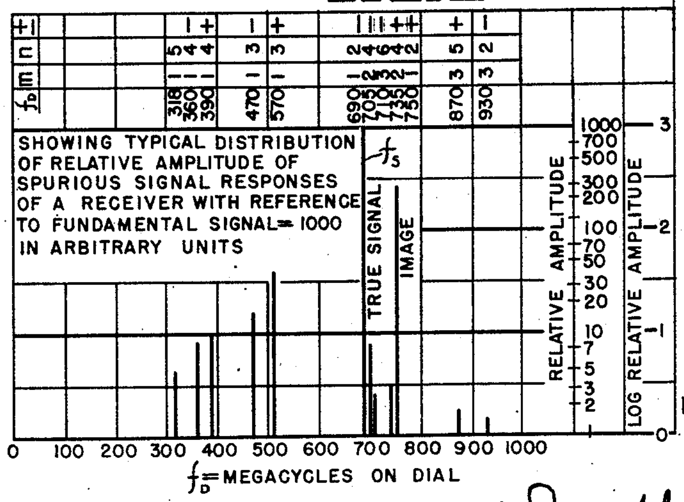
Fig. 4 is a diagram showing, in a typical case, various amplitudes of received spurious responses in relation to the amplitude of the received fundamental signal frequency.

Referring to Fig. 4, there is shown a typical distribution of the relative amplitudes of spurious signal responses with reference to the fundamental signal amplitude arbitrarily taken as 1,000 units. The values of $m$, $n$, and the "plus" or "minus" signs of the intermediate frequencies in Equation 6 are identified alongside each corresponding response. The spurious responses obtained are apparently randomly distributed; so that to predict which of the signals received corresponds to the fundamental signal frequency, on the basis of a comparison of the relative amplitudes obtained, does not yield a positive identification. This is particularly true since the amplitude of the fundamental carrier frequency is not generally known and may be varying with time. It is thus difficult to distinguish the fundamental signal frequency from a group of signals containing a large number of spurious responses, as well as possible additional signals from other sources, which may vary from extremely weak signals, to signals of considerable amplitude.

The present invention resolves the abovementioned difficulties, and provides a frequency determining and distinguishing device whereby the fundamental signal frequency may be readily selected and identified from amongst a group of spurious radio frequencies, which may also contain other carrier fundamentals, as well as corresponding additional spurious frequencies belonging to the other fundamental signal frequencies.

Figure 5:
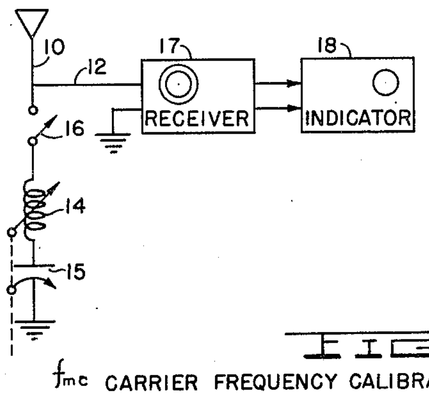
Fig. 5 is a schematic diagram of a system according to this invention.

Referring now to Fig. 5, there is shown an antenna 10, an input line 12, preferably of the coaxial type, an adjustable series-resonant wave trap comprising variable inductance and capacitance elements 14 and 15 respectively, grounded at one end, and capable of being connected or disconnected, as desired, across the input coaxial line by means of switch 16. The receiver 17, and the indicator 18, are shown in block diagram in this figure.

Figure 6:
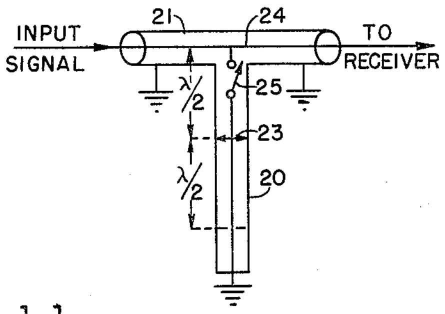
Fig. 6 is an equivalent circuit diagram of a device according to this invention.

Referring to Fig. 6, there is shown a coaxial stub 20 connected across a coaxial input line 21 to produce a large attenuation of the signal supplied to the receiver when the shorting bar 23 is placed one-half wave length, or integral multiple thereof, from the central conductor 24 of the receiver input transmission line 21. The attenuation of the signal is due to the low impedance produced by the effect of a shorted half-wave stub placed across a transmission line. Successive nulls separated by intervals of one-half an electrical wave length may also be found along the stub 20, as indicated. The position of the nulls on the stub 20 is independent of the point at which the stub is tapped into the transmission line. However, the amount of attenuation obtained at the null point depends upon whether standing waves on the line present a voltage minimum, maximum, or intermediate value at the tapping point.

It is possible to calibrate a tuning stub over a wide frequency range in terms of the positions of the first null, but a greater accuracy in frequency measurement can be obtained by finding the distance between any two adjacent nulls.

A lumped circuit wave trap utilizing the inductance inherent in a variable condenser may be electrically equivalent to the stub and a more compact design may be thus obtained in a lower frequency range. However, this kind of device, unlike the stub, cannot be used without special caution, because spurious nulls may be observed when tuning signals higher in frequency than the calibrated range of the lumped circuit.

In any case, however, a switch 25 is provided for switching the stub 20 effectively in and out of circuit with the transmission line 21. As above indicated, when the stub is disconnected from the transmission line 21, the insertion loss due to the wave trap in the antenna is negligible, and in this case the signal picked up by the receiver experiences negligible attenuation.

Figure 7:
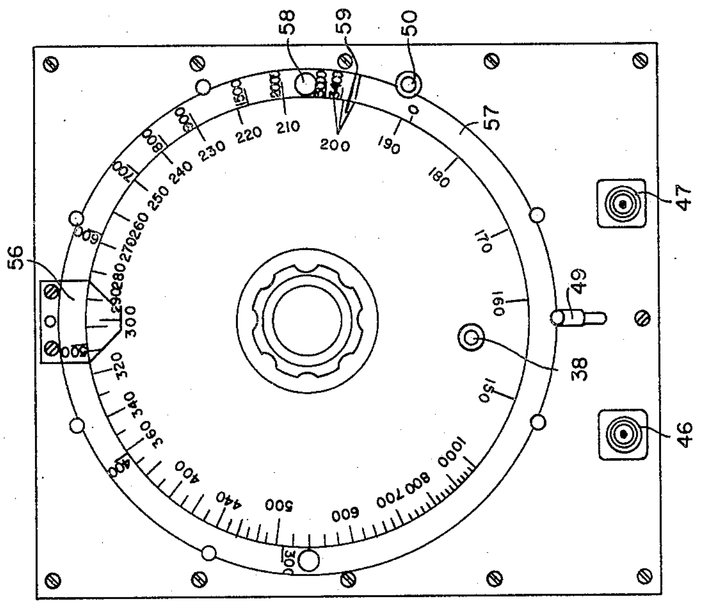
Fig. 7 is a front view of a preferred embodiment of this invention.
Figure 8:
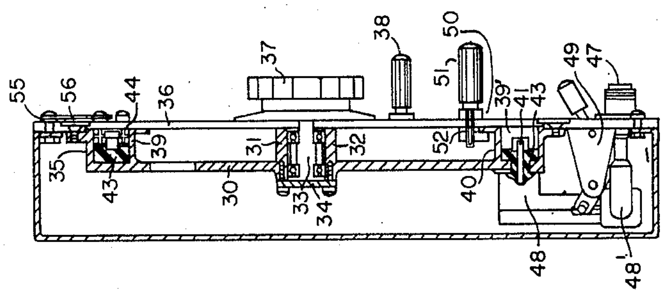
Fig. 8 is a sectional side view of the device shown in Fig. 7.

Referring now to Figs. 7 and 8 there is shown one practical form of the frequency-determining device embodying the principles of this invention.

In Figs. 7 and 8 there is shown a circular metal support or frame 30 having enclosing walls. Centrally formed in the support 30 is the bearing housing or hub 31 in which ball bearing units 32 are mounted. Shaft 33 is supported for rotation by the ball bearing units 32 which, in turn, are held in place by means of the bolted end-plate 34. A circular flanged outer wall 35 is provided by which the support 30 is attached to the front panel 55 of the device. Mounted upon the shaft 33 is the graduated dial plate 36, which is circular in shape and which may be turned by means of the knob 37 or by the crank 38 which is affixed to the outer face of the dial 36.

An inner circular wall 39 having a flanged portion is provided, the wall member 39 being concentric with and spaced within the outer circular wall 35 thereby forming the annular groove or circular channel 39'. The groove or channel 39' also is concentric with the shaft 33, the walls of the groove 39' forming the outer conductor of the coaxial stub line generally designated 40 which is circularly disposed and concentric about the shaft 33. The central or inner conductor 41 of the circular stub 40 is mounted upon the dielectric element 43 which forms the floor of the groove 39' and acts to provide distributed capacity loading for the stub.

Affixed to the dial 36 is the sliding contactor 44 which includes metal spring fingers arranged in sliding engagement with both conductors and for shorting the central conductor to the outer conductor 39' of the circular coaxial stub as the slider 44 rotates, and in its various adjusted positions. The circular form of stub 40 enables a rotary adjustment of the slider 44, without play or back lash.

The diameter of the circular stub 40 is considerably reduced, for a definite frequency range, because of the distributed capacity effect of the dielectric loading action of element 43 which is employed. The dielectric element 43 may be of suitable dielectric material, such as for example, a polystyrene insulator, placed between the central conductor 41 of the coaxial stub 40 and the groove 39' forming the outer conductor of the coaxial stub 40. The result of the distributed capacity loading 43 is to reduce the effective length of the stub to the shorting contactor required to produce a null. The input from the antenna is taken at coaxial connector 46 and the output to the receiver is taken at coaxial connector 47, these connectors being joined by means of the coaxial line 48 which is T-connected via branch 48' to a switch 49. The line 48 forms a part of the length of the stub 40 and it is connected or disconnected, as desired, by means of the switch 49, in and out of circuit with the T-connection element 48' in the coaxial line 48.

When the stub is tuned to the frequency of the incoming signal, the stub length being one-half wave length at the null point, the connection of the tuning stub 40 across the antenna input cable at 48 produces a series-resonant path to ground thus shorting the signal energy to ground before reaching the receiver. By means of the switch 49 the stub 40 may be disconnected from the coaxial input line 48 when the stub is not in use or when a signal is being sought.

The dial 36 may be locked in place by means of the clamp device 50 which includes a knob 51 the turning of which draws a flanged clamp nut 52 into tight clamping engagement with the underface of the flanged portion of the wall member 39 of the support 30.

Affixed to the front panel 55 of the frequency distinguishing device is the transparent pointer 56. Dial face 36 is calibrated directly in frequency of series resonance corresponding to the position of the shorting contactor 44 in the circular stub 40. This frequency is read off opposite the pointer 56 when a null is observed and the stub 40 is connected by switch 49 effectively to the input signal line.

A second outer annular dial 57 outside of and concentric with the central dial 36 is free to rotate by means of the crank handle 58 affixed to the outer dial 57.

In the higher frequency range, multiple nulls are often obtained and it is therefore necessary to provide a fixed reference point from which the distance between adjacent multiple nulls may be measured. Accordingly, inner dial 36 is provided with a transparent pointer 59 which may be used as a reference point from which to measure the distance between adjacent multiple nulls in the higher frequency range. The procedure is to locate a null point in the higher frequency range and set the dial pointer 59 upon a reference marking on dial 57. Dial 36 is then moved until the pointer 59 is opposite an adjacent null and the frequency may then be read off on the proper scale provided on the dial 57 opposite the pointer 59.

Now, to accurately determine the fundamental frequency of an input signal being received, the wave trap first should be disconnected from the line during the "tuning in" of a signal so that the signal may be received without excessive attenuation. Thus, when the receiver is tuned to a received signal, the switch 49 is thrown into a position to disconnect the stub 40 from the coaxial input signal line 48. As the next step, the slider 44 on the circular stub is initially placed at the minimum length on the said stub. In order to determine whether or not the reading noted on the scale of the receiver dial is correctly reading the fundamental frequency of the signal, the stub 40 is next connected across the input line by switch 49. The slider 44 on the circular wave trap or stub 40 is then moved so as to increase the effective length of the stub until a null is obtained; that is, until the signal to the receiver is strongly attenuated.

If the frequency calibration noted on the calibrated dial of the wave trap is the same as the reading indicated by the frequency-calibrated dial on the receiver, then the receiver is tuned to the fundamental frequency and the frequency of the indicating carrier will then be quite accurately determined. If otherwise, the receiver should be re-tuned to the frequency reading obtained on the wave trap at the null point, the switch 49 being disconnected during this retuning operation. If desired, a quick check may be made by again reconnecting the wave trap following which the null frequency readings obtained should be the same then on the scales of both the wave trap and the receiver dials.

By this means it is possible to distinguish between spurious and fundamental signals being received and to readily determine fundamental carrier frequencies being received.

The frequency-determining device shown in Figs. 7 and 8 is particularly suitable for the frequency range from 150 to 3400 megacycles, although it will be understood that the principles herein described are applicable to higher or lower frequency ranges than the above frequencies.

Direct frequency calibration from 150 to 3400 megacycles may be provided in one embodiment of the invention. Frequencies above 1,000 megacycles, however, are preferably measured by finding the distance between two adjacent nulls on the sliding scale, as above described. This has the advantage of greater accuracy on weak signals. Also when a null is encountered between 500 and 1,000 megacycles, it must be checked to determine whether or not a higher frequency null is being obtained. This may be done by tuning from 500 to 3500 megacycles without finding a second null. The check on signals between 500 and 1,000 megacycles is required because the mechanical arrangements of the switch 49 are such to prevent the tuning slider from being moved all the way up to the antenna input line. In consequence, it is possible that a high frequency null might be received such that the second null occurred between 500 and 600 megacycles, while the first null was inaccessible. This could result in ambiguity unless the additional check is made.

The additional check may be made by moving the pointer 59 opposite the reference point on the dial 36, and then moving the dial 36 until an adjacent null is obtained. The frequency indicated then corresponds accurately to the frequency being measured.

Figure 9:
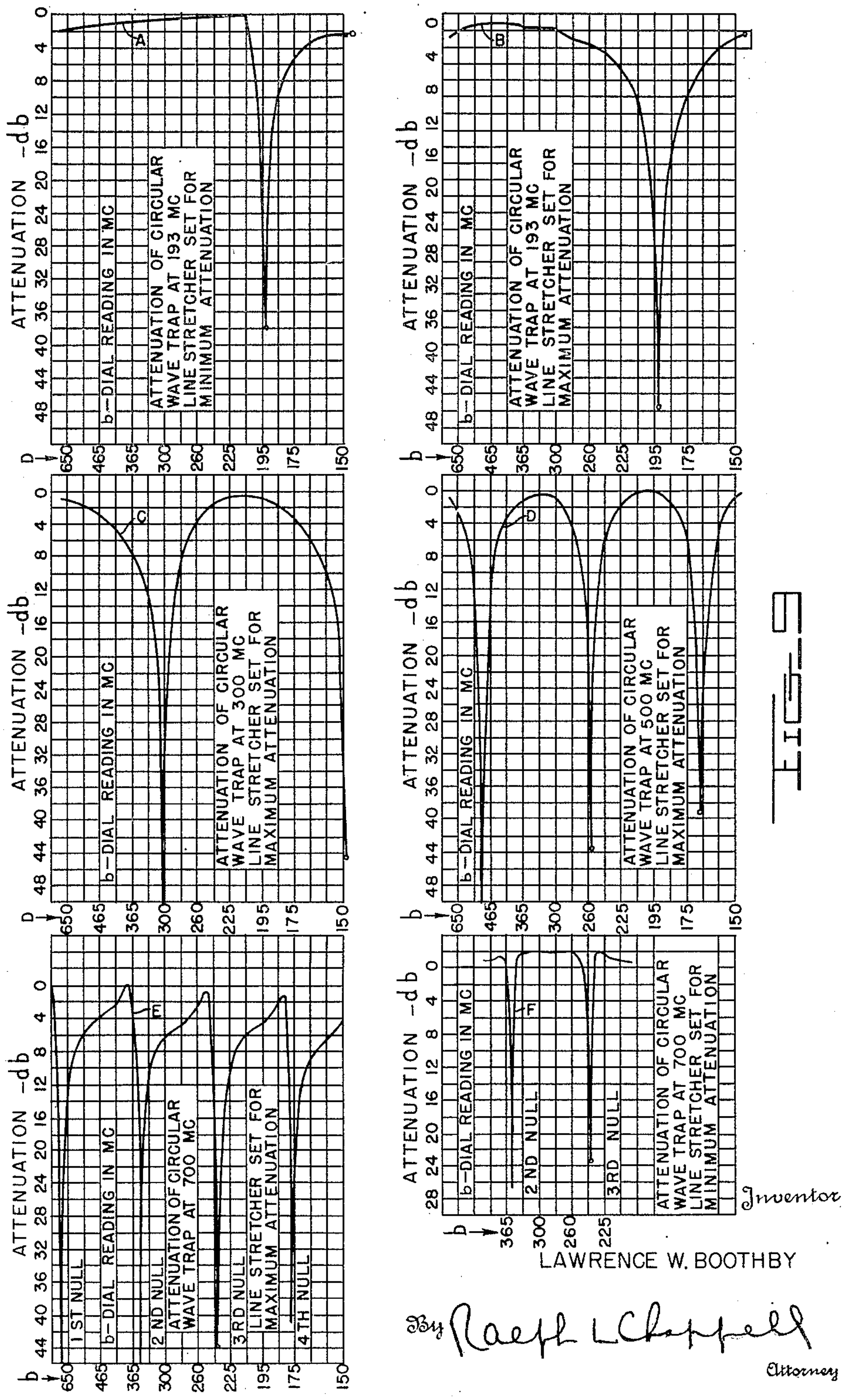
Fig. 9 shows various attenuation curves A to F inclusive characteristic of the device shown in Figs. 7 and 8, indicating variations in attenuation obtained when the shorting contactor of the device is moved into various positions along the stub at various frequencies and with different lengths of line.
Figure 12:
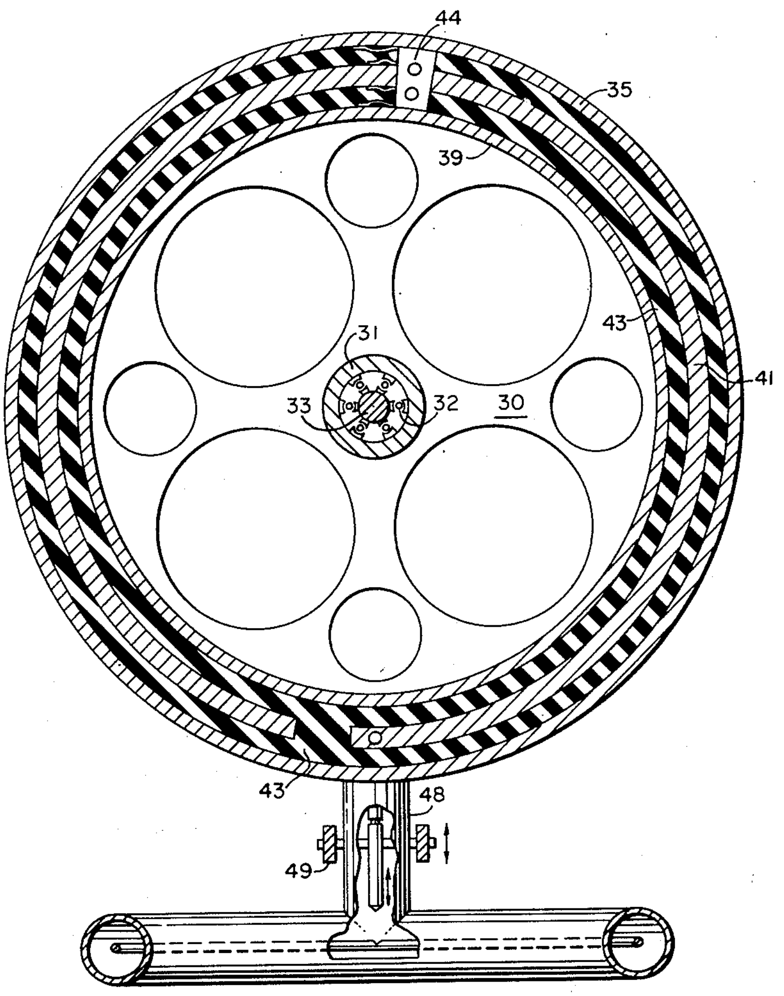
Fig. 12 is a sectional front view of the device in Fig. 7 taken behind the front plate through the dielectric but showing the sliding contact 44 in elevation, a portion of the switch assembly 49 is cut away.

Referring to Fig. 9, there is shown a number of curves relating to the attenuation of the signal received by the superheterodyne receiver when the shorting contactor on the stub is placed at various positions along the stub. In preparing the curves various lengths of line were simulated by a line stretcher to obtain the maximum and minimum attenuations which were to be expected using various lengths of line.

Comparison of curves A to F inclusive in Fig. 9, shows that the length of the line between the wave trap and the radio receiver exercises considerable influence on the symmetry, or lack of symmetry of the attenuation curve; and, also upon the maximum and minimum attenuation; but, however, the position of the maximum attenuation point, or null point, is not affected thereby.

Figure 10:
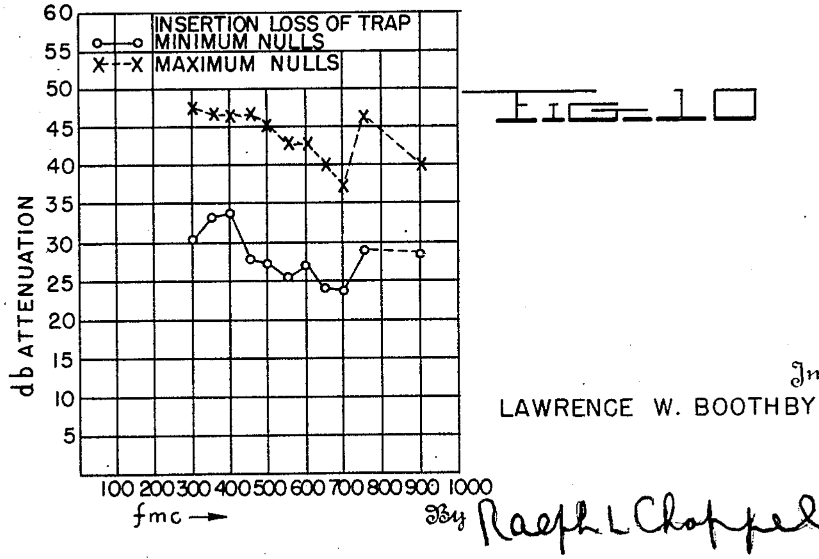
Fig. 10 is a plot of the maximum and minimum attenuation obtainable at various frequencies with the device shown as Figs. 7 and 8.

In Fig. 10 there is summarized the maximum and minimum attenuation observed throughout the frequency range from 300 to 900 megacycles with the particular embodiment of this invention herein described. Although there is considerable variation between maximum and minimum attenuations obtainable throughout this frequency range, nevertheless, the minimum attenuation is adequate to produce satisfactory results throughout the entire frequency range.

On strong signals, an accurate frequency setting may be obtained by merely adjusting the shorting contactor on the stub to the position of maximum attenuation. However, on weak signals, the maximum attenuation which will permit the signal to just be perceptible is considerably less than the very greatest attenuation obtained at the point. Consequently weak signals will disappear a considerable distance to each side of the actual null point, and since the symmetry of the curve will vary according to the frequency of the received signal, and according to the length of the line attached between the wave trap and the receiver, therefore, in general, no prediction can be made as to the inaccuracy thereby introduced into the frequency measurement.

However, it has been observed that the condition of symmetry, or asymmetry, obtained upon successive adjacent nulls are similar. Consequently, with weak signals it is possible to obtain an accurate determination of the frequency of the signal by measuring between successive or adjacent nulls to the point where the signals are just perceptible.

Figure 11:
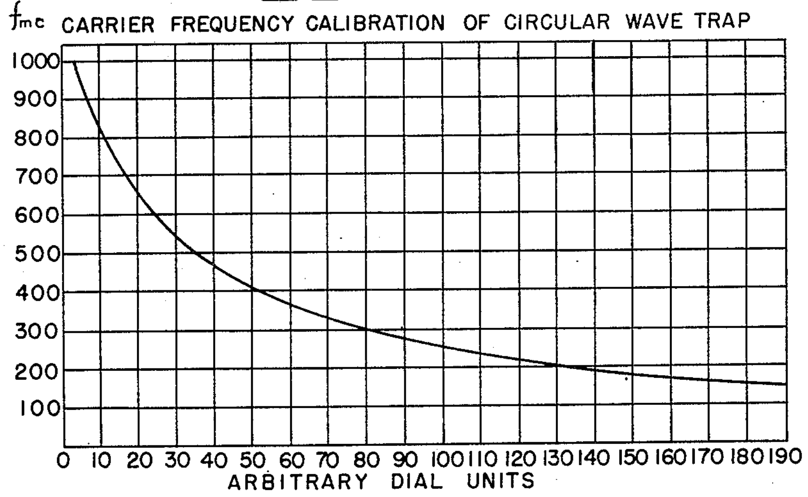
Fig. 11 is a calibration curve of the device shown in Figs. 7 and 8.

Referring to Fig. 11, there is shown a typical frequency calibration of the herein described embodiment of this device. It will be understood, however, that it is within the province of this invention to include cams or other mechanical devices which may be such as to provide a straight-line calibration curve of frequency versus dial reading.

As various other changes may be made in the form, construction, and arrangement of the parts herein, without departing from the spirit or scope of the invention, and without sacrificing any of its advantages, it is to be understood that all matter herein is to be interpreted as illustrative and not in the limiting sense.

The invention described herein may be manufactured and used by or for the Government of the United States of America for governmental purposes without the payment of any royalties thereon or therefor.

What is claimed is:

1. A frequency-determining device comprising a shaft, a stub line section bent into substantially circular form concentric with said shaft and having inner and outer conductors, capacity dielectric loading between the conductors of said stub, a coaxial line having input and output connections, said coaxial line also having a T-connection between said input and output connections, a switch adapted to alternately connect or disconnect said stub from said T-connection, a first dial rotatable about said shaft, a sliding contactor affixed to said dial and capable of shorting the inner and outer conductors of said stub, a second rotatable dial concentric with said first dial, and frequency calibrations upon said second dial which indicates the series-resonant frequency corresponding to the position of the aforesaid slider contactor.

2. In a superheterodyne receiving system including an antenna therefor, an input circuit connecting said receiving system to said antenna comprising, a coaxial line, a T connection in said line, the leg of said T connection comprising a calibrated adjustable series-resonant coaxial stub line bent into substantially circular form, shorting means adapted to rotate within said stub to adjust the electrical length of said stub, and means for switching said stub line effectively in and out of said circuit.

3. In a superheterodyne receiving system including an antenna therefor, an input circuit connecting said receiving system to said antenna comprising, a coaxial line, a T connection in said line, the leg of said T connection comprising a calibrated adjustable series-resonant coaxial stub bent into substantially circular form, shorting means adapted to rotate within said stub, a circular dial affixed to said shorting means, said dial being directly calibrated to the series-resonant frequency of said stub, and means for switching said stub effectively in and out of said circuit.

4. In a superheterodyne receiving system including an antenna therefor, an input circuit connecting said receiving system to said antenna comprising, a coaxial line, a T connection in said line, the leg of said T connection comprising a calibrated adjustable series-resonant coaxial stub having distributed capacity loading, shorting means adapted to rotate with said stub to adjust the electrical length of said stub, and means for switching said stub effectively in and out of said circuit.

5. In a superheterodyne receiving system including an antenna therefor, an input circuit connecting said receiving system to said antenna comprising, a coaxial line, a T connection in said line, the leg of said T connection comprising a series-resonant coaxial stub line bent into substantially circular form, shorting means adapted to rotate within said stub, a circular dial affixed to said shorting means and rotatably mounted on an axis concentric with said circular stub, an annular dial rotatable on the same axis and disposed about the periphery of said circular dial, a fixed pointer indicating on said annular dial and a second pointer attached to and rotating with said annular dial and indicating on said circular dial.

LAWRENCE W. BOOTHBY.

REFERENCES CITED

The following references are of record in the file of this patent:

UNITED STATES PATENTS

| Number | Name | Date |
|---|---|---|
| 1,768,251 | Heising | June 24, 1930 |
| 2,005,772 | Chirex | June 25, 1935 |
| 2,121,855 | Bushbeck | June 28, 1938 |
| 2,126,541 | De Forest | Aug. 9, 1938 |
| 2,189,549 | Hershberger | Feb. 6, 1940 |
| 2,238,438 | Alford | Apr. 15, 1941 |
| 2,292,254 | Van Beuren | Aug. 5, 1942 |
| 2,326,519 | Burnside | Aug. 10, 1943 |
| 2,400,597 | Peterson | May 21, 1946 |
| 2,400,619 | Woodward | May 21, 1946 |
| 2,463,417 | Overacker | Mar. 1, 1949 |